# (12) United States Patent
Hori

(10) Patent No.: US 8,570,000 B2
(45) Date of Patent: Oct. 29, 2013

(54) VEHICLE POWER-GENERATION CONTROL APPARATUS

(75) Inventor: Yasuyoshi Hori, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 340 days.

(21) Appl. No.: 13/079,406

(22) Filed: Apr. 4, 2011

(65) Prior Publication Data

US 2012/0098502 A1 Apr. 26, 2012

(30) Foreign Application Priority Data

Oct. 25, 2010 (JP) ................................ 2010-238536

(51) Int. Cl.
*H02J 7/04* (2006.01)
*H02J 7/14* (2006.01)
*H02J 7/00* (2006.01)
*B60L 9/00* (2006.01)

(52) U.S. Cl.
USPC ............. 320/162; 320/104; 320/132; 701/22; 903/903; 903/930

(58) Field of Classification Search
USPC ............. 320/162, 104, 132; 701/22; 903/903, 903/930
See application file for complete search history.

(56) References Cited

U.S. PATENT DOCUMENTS

| | | | | |
|---|---|---|---|---|
| 6,344,732 | B2 * | 2/2002 | Suzuki | 320/132 |
| 7,019,489 | B2 * | 3/2006 | Nakada | 320/104 |
| 8,150,572 | B2 * | 4/2012 | Yamamoto et al. | 701/22 |
| 2001/0024104 | A1 | 9/2001 | Suzuki | |

FOREIGN PATENT DOCUMENTS

| | | |
|---|---|---|
| JP | 08-163706 A | 6/1996 |
| JP | 2001157306 A | 6/2001 |
| JP | 2001268719 A | 9/2001 |
| JP | 2002-58111 A | 2/2002 |

OTHER PUBLICATIONS

Japanese Office Action issued Apr. 24, 2012 in Japanese Patent Application No. 2010238536.

\* cited by examiner

*Primary Examiner* — M'Baye Diao
(74) *Attorney, Agent, or Firm* — Sughrue Mion, PLLC

(57) ABSTRACT

When an estimated charging rate of an electric storage device is lower than a target rate, and a regenerative power generation controller performs power-generation control of an electric power generator when the speed of a vehicle is being reduced and fuel supply to an engine is stopped, a regenerative charging amount predictor predicts a regenerative charging rate in accordance with vehicle speed, as the vehicle speed is being reduced, and the target charging rate of the electric storage device is decreased as the regenerative predicted charging amount increases. The regenerative power generation controller limits a power-generation amount toward reduction in such a way that in the electric power generator, a difference between torque required for power generation when the electric storage device is charged and torque required for power generation when the electric storage device is not charged falls within a predetermined torque difference.

3 Claims, 5 Drawing Sheets

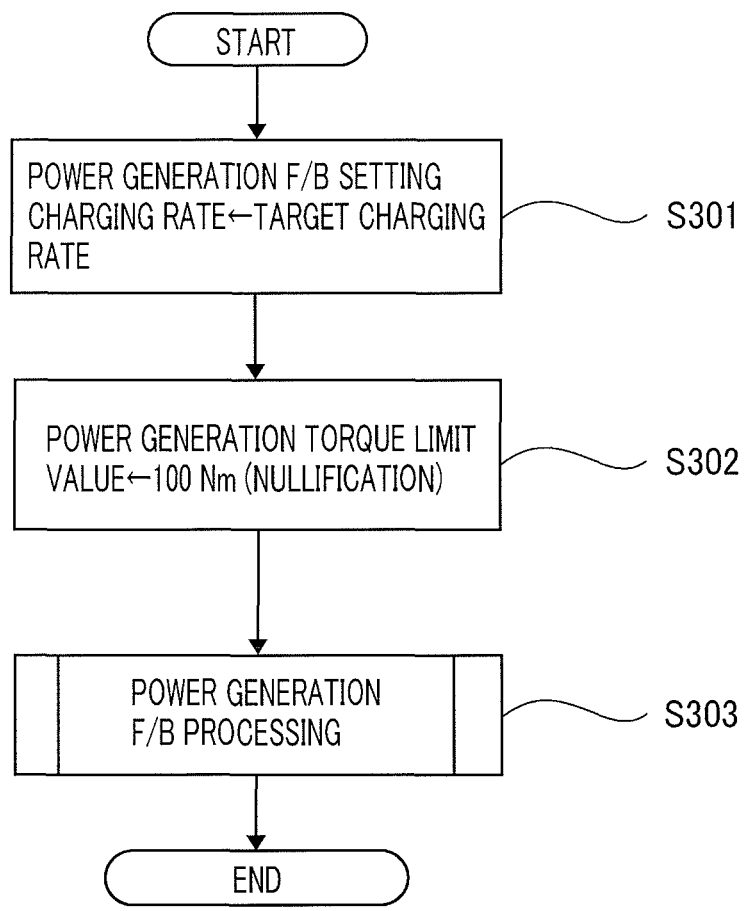

VEHICLE POWER-GENERATION CONTROL APPARATUS

BACKGROUND OF THE INVENTION

1. Field of the Invention

The present invention relates to a vehicle power-generation control apparatus that positively implements regenerative power generation when the speed of a vehicle is reduced.

2. Description of the Related Art

With regard to conventional power-generation control apparatuses, especially to a vehicle power-generation control apparatus that positively implements regenerative power generation when the speed of a vehicle is reduced, as disclosed in Patent Document 1, there exists a vehicle power-generation control apparatus that reduces the rate of charging of a secondary battery from a power-generating apparatus as the vehicle speed rises, and increases charging through a regenerative electric current.

The conventional apparatus disclosed in Patent Document 1 makes it possible to recover, without loss, regenerative energy that is approximately in proportion to the square of the vehicle speed, whereby the consumption of fuel required to make a vehicle travel can considerably be reduced.

In addition, torque control at a time when regenerative power generation is performed relates to an electric vehicle; however, as disclosed in Patent Document 2, there exists an apparatus configured in such a way as to implement variable control of regenerative braking force in accordance with the operation of a manual switch only when the accelerator pedal and the brake pedal are not operated.

In the case of the conventional apparatus disclosed Patent Document 2, the regenerative braking force can be adjusted in accordance with the driver's preference so that when the driver desires sufficient braking, sufficient regenerative braking force is securely exerted.

[Prior Art Reference]
[Patent Document]

[Patent Document 1] Japanese Patent Application Laid-Open No. 2002-58111

[Patent Document 2] Japanese Patent Application Laid-Open No. H8-163706

In the case of the foregoing conventional apparatus, before the regenerative power generation is implemented while the vehicle travels, the charging rate of an electric storage device is kept low, and especially, the power-generation amount is not limited while the brake is operated; therefore, although it is within the tolerance range of the electric storage device or the electric power generator, a large current flows during the time of initial regenerative power generation, and the power generation torque becomes large, as well. However, when on a long descending slope or the like, the electric storage device is fully charged and hence the electric power generator stops generation of electric power, the power generation torque steeply decreases; thus, a shock may occur or a change (decrease) in the feeling of deceleration may deteriorate the drivability.

In addition, even in the case where the driver can set the regenerative braking force, if the charging rate of the electric storage device is not specified at the time of the setting, it is uncertain whether or not the braking force expected by the driver can be obtained when the charging rate differs from the charging rate at the time of the setting; in contrast, because it makes the apparatus and the operation complex, implementation of the setting corresponding to the charging rate of the electric storage device is not realistic.

In addition, the power-generation control is not especially referred to, which is performed after the regenerative power generation has been completed in a situation where the regenerative electric power amount is insufficient due to decrease in the regenerative power generation amount caused by the foregoing limitation of the regenerative braking force, a short regenerative power generation period, or the like.

SUMMARY OF THE INVENTION

The present invention has been implemented in order to solve the problems in the foregoing conventional apparatuses; the objective thereof is to provide a vehicle power-generation control apparatus that efficiently charges an electric storage device, when regenerative power generation is implemented, so that the drivability is prevented from deteriorating due to a change in the power generation torque required for the regenerative power generation.

A vehicle power-generation control apparatus according to the present invention is provided with an internal combustion engine that generates driving force for a vehicle; an electric power generator that converts kinetic energy supplied from the vehicle or the internal combustion engine into electric energy; an electric storage device that stores electric energy generated by the electric power generator and supplies electric power required by the vehicle; a voltage-current detection means that detects the voltage and the current of the electric storage device; an estimated charging rate calculation means that estimates a charging rate of the electric storage device based on the voltage and the current detected by the voltage-current detection means; a target charging rate calculation means that calculates a target charging rate of the electric storage device; a normal power generation control means that performs power-generation control of the electric power generator in such a way that an estimated charging rate of the electric storage device coincides with a target charging rate calculated by the target charging rate calculation means, in the case where the estimated charging rate of the electric storage device is lower than the target charging rate; a regenerative power generation control means that performs power-generation control of the electric power generator at a charging rate, of the electric storage device, that is the same as or lower than a predetermined charging rate at which overcharging is not caused, during a period in which the speed of the vehicle is being reduced and fuel supply to the internal combustion engine is stopped; a vehicle-speed detection means that detects a traveling speed of the vehicle; and a regenerative charging amount prediction means that predicts a regenerative charging rate in accordance with a vehicle speed detected by the vehicle-speed detection means, when the vehicle speed is being reduced. The target charging rate calculation means decreases the target charging rate of the electric storage device as a regenerative predicted charging amount obtained by the regenerative charging amount prediction means increases; the regenerative power generation control means limits a power-generation amount toward reduction in such a way that in the electric power generator, a difference between torque required for power generation at a time when the electric storage device is charged and torque required for power generation at a time when the electric storage device is not charged falls within a predetermined torque difference; and the normal power generation control means stops its operation when the regenerative power generation control means is being implemented.

In the vehicle power-generation control apparatus according to the present invention, a regenerative charging rate is predicted in accordance with a vehicle speed, when the vehicle speed is being reduced; the target charging rate of the electric storage device is decreased as the regenerative predicted charging amount increases; and the regenerative power generation amount is limited toward reduction in such a way that the difference between torque required for power generation at a time when the electric storage device is charged and torque required for power generation at a time when the electric storage device is not charged falls within a predetermined torque difference. As a result, the electric storage device can be efficiently charged when regenerative power generation is implemented, and at the same time, a change in the power generation torque can be prevented from deteriorating the drivability when the regenerative power generation is implemented.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 5 is a flowchart representing normal power generation control processing in a vehicle power-generation control apparatus according to Embodiment 1 of the present invention.

DETAILED DESCRIPTION OF THE PREFERRED EMBODIMENT

Embodiment 1

Figure 1:
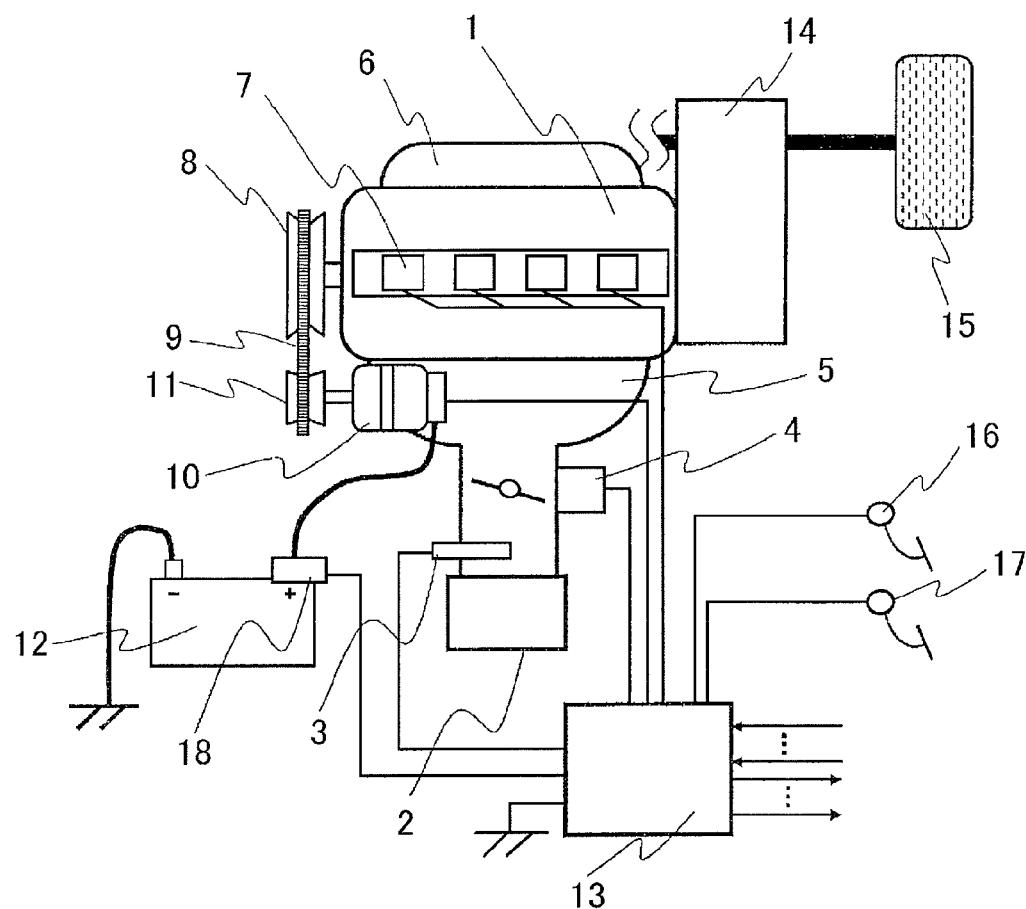
FIG. 1 is a configuration diagram illustrating the system configuration of a power source system in a vehicle power-generation control apparatus according to Embodiment 1 of the present invention.

Hereinafter, a vehicle power-generation control apparatus according to Embodiment 1 of the present invention will be explained with reference to the drawings. FIG. 1 is a configuration diagram illustrating the system configuration of a power source system in a vehicle power-generation control apparatus according to Embodiment 1 of the present invention.

In FIG. 1, an internal combustion engine 1 has a plurality of cylinders (four cylinders, in the example illustrated in FIG. 1); the intake side and the exhaust side of each cylinder are connected with an intake pipe 5 and an exhaust pipe 6 through an intake valve (unillustrated) and an exhaust valve (unillustrated), respectively. The internal combustion engine 1 has a plurality of ignition coils 7 provided in the respective cylinders and a plurality of ignition plugs (unillustrated) that generate spark discharges in the respective cylinders, based on high voltages supplied from the ignition coils 7. The respective ignition coils 7 are configured integrally with the corresponding ignition plugs.

An air cleaner 2 is provided at the upstream side of the intake pipe 5 and purifies air to be taken in. An intake amount sensor 3, in the intake pipe 5, that is provided at the downstream of the air cleaner 2 measures the amount of air to be taken in by the internal combustion engine 1 through the intake pipe 5 and outputs a signal corresponding to the measurement value. An electric throttle 4 adjusts the amount of air to be taken in by the internal combustion engine 1, by controlling throttle valve opening degree.

An accelerator sensor 16 detects the amount of accelerator operation by a driver and outputs a signal corresponding to the detection value. This signal enables the detection as to whether or not there exists accelerator operation; in the case of depression of accelerator pedal, it can be determined that an acceleration request exists; in contrast, in the case where there exists no accelerator operation and hence the operation amount is "0", it is determined that there exists an intention of deceleration, and when a predetermined condition is satisfied, fuel supply to the internal combustion engine is stopped. In addition, a brake switch 17 detects the operation of a brake and outputs a signal indicating whether or not there exists depression of the brake.

An electric power generator 10 is configured in such a way that a pulley 11 fixed on the rotor shaft thereof is coupled, through a belt 9, with a pulley 8 mounted on the crank shaft of the internal combustion engine 1. Power generation is carried out by rotating the rotor of the electric power generator 10 by means of driving power from the internal combustion engine 1. The electric power from the electric power generator 10 is supplied to a battery 12 so that the battery 12 is charged. On the battery 12, there is provided a battery sensor 18 that detects the current and the voltage of the battery 12. Based on these values, it is determined whether or not charging of the battery 12 is being performed and the charging rate is estimated.

A control unit 13 including a calculation device (referred to as a CPU, hereinafter) such as a microcomputer, a memory, and the like is connected with the intake amount sensor 3, the accelerator sensor 16, the electric throttle 4, the ignition coil 7, the electric power generator 10, the battery 12, the battery sensor 18, and the like, and controls the internal combustion engine 1 and the electric power generator 10, based on the output signals from various kinds of sensors such as the accelerator sensor 16, brake switch 17, and the battery sensor 18. In addition, a vehicle speed sensor (unillustrated) that detects a vehicle speed is also connected with the control unit 13.

Figure 2:
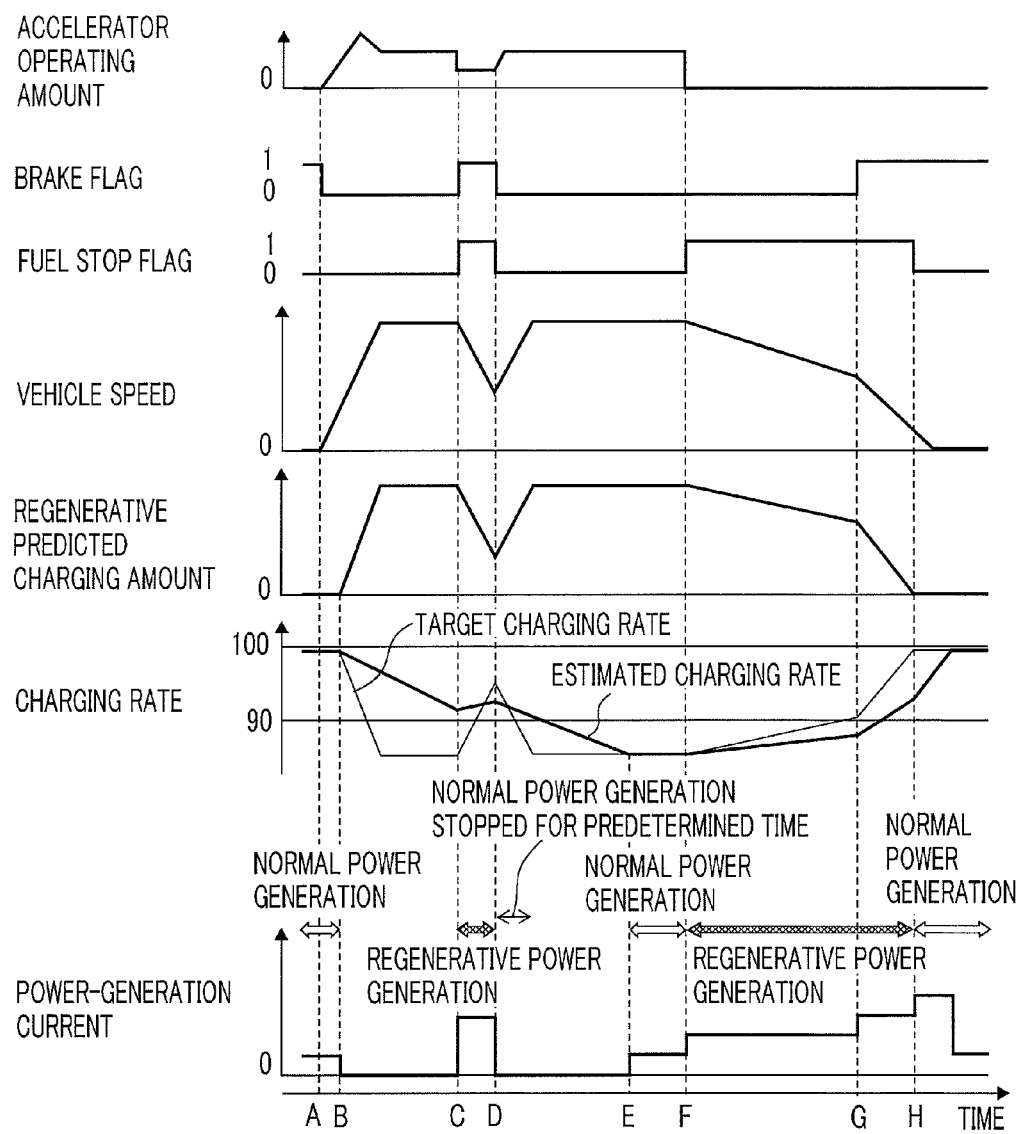
FIG. 2 is a timing chart representing respective behaviors of parameters, during a period from the start of a vehicle to the stop thereof, in a vehicle power-generation control apparatus according to Embodiment 1 of the present invention.

FIG. 2 is a timing chart representing respective behaviors of parameters, during a period from the start of a vehicle to the stop thereof, in the vehicle power-generation control apparatus according to Embodiment 1 of the present invention; the abscissa denotes the time.

The parameters in FIG. 3 will be explained in sequence from top to bottom. The accelerator operating amount is a signal from the accelerator sensor 16 and becomes "0" when there exists no accelerator operation. The brake flag is a signal from the brake switch 17 and becomes "1" when a brake pedal is depressed. The fuel stop flag becomes "1" when fuel supply to the internal combustion engine 1 is being stopped.

The regenerative predicted charging amount is a value obtained by predicting, in accordance with the vehicle speed, a charging amount in regenerative power generation when the speed is reduced; the regenerative predicted charging amount is calculated by a regenerative charging amount prediction means. Because the higher the vehicle speed is, the larger the kinetic energy of the vehicle becomes, the kinetic energy that can be supplied from the vehicle to the electric power generator 10 increases when speed-reducing regeneration is performed, whereby the regenerative charging amount also increases. Accordingly, the regenerative predicted charging amount tends to increase as the vehicle speed rises. In this regard, however, the performances of the electric power generator 10 and the battery 12 limit the power-generation amount and the charging amount; therefore, when the vehicle speed is high, the regenerative predicted charging amount is also limited. In addition, immediately before the vehicle stops, the vehicle (a drive wheel 15) and the internal combustion engine 1 are separated from each other and hence it is difficult to recover the kinetic energy; therefore, it is preferable to set the regenerative predicted charging amount to "0" when the vehicle speed is low.

The charging rate includes a target value and an estimated value; the target charging rate is a target value of the charging rate of the battery 12 and calculated by a target charging rate calculation means. In order to efficiently charge the battery 12 when regenerative power generation is implemented, the target charging rate is set in such a way as to decrease as the regenerative predicted charging amount increases. However, taking the deterioration of the battery 12 into consideration, it is required to avoid an extremely low charging rate; therefore, in the case where the regenerative predicted charging amount becomes the same as or larger than a predetermined value, the target charging rate may be a constant value.

The estimated charging rate is a value obtained by estimating the charging rate of the battery 12 based on the voltage and the current detected by the battery sensor 18 and is calculated by an estimated charging rate calculation means. The charging rate may be estimated through a publicly known method; as disclosed in Patent Document 1, the charging rate may be estimated by preliminarily storing the standard characteristics of the battery 12 in the control unit 13 and comparing the characteristics with the detected voltage and current. Lastly, the power-generation current is an electric current outputted from the electric power generator 10; it is a signal from a current sensor (unillustrated) provided in the electric power generator 10.

The respective parameters will be explained; at first, at a time point A, the driver releases the brake pedal and depresses the accelerator pedal, and then the vehicle, which has been in the stop mode, starts. When at a time point B, the vehicle speed exceeds a predetermined vehicle speed, the regenerative predicted charging amount increases as the vehicle speed rises and the target charging rate decreases; thus, the estimated charging rate becomes larger than the target charging rate, whereby a normal power generation control means makes the electric power generator 10 stop generation of electric power. After that, the electric power stored in the battery 12 is supplied to the vehicle until the estimated charging rate becomes smaller than the target charging rate; therefore, the electric power generator does not operate and hence the fuel for generating electric power can be reduced.

At a time point C, the driver makes the accelerator operating amount to be "0" and depresses the brake pedal so as to reduce the vehicle speed; thus, fuel supply to the internal combustion engine 1 is stopped and hence the vehicle speed decreases. In this period, a regenerative power generation control means performs regenerative power generation. Because while the speed is reduced, fuel supply to the internal combustion engine 1 is not implemented and the kinetic energy of the vehicle can be utilized for power generation, i.e., it can be recovered, the gasoline mileage can accordingly be raised.

In electric-power generation by the normal power generation control means, when the estimated charging rate of the battery 12 is larger than the target charging rate, electric-power generation is not implemented; however, in regenerative power generation, because electric-power generation is implemented without utilizing the fuel for the internal combustion engine 1, it is preferable to implement electric-power generation as much as possible within restriction; thus, regardless of the target charging rate, electric-power generation is implemented. In this regard, however, if charging is implemented to such an extent that the estimated charging rate of the battery 12 exceeds 100%, the battery 12 is overcharged, whereby the deterioration thereof is accelerated and the lifetime thereof is shortened. Accordingly, it is preferable to charge the battery 12 up to a predetermined charging rate, for example, approximately 98%, taking a control error and the like into account.

In addition, the restriction on the regenerative power generation will be explained. In view of energy recovery, there exists a way of thinking that because the estimated charging rate of the battery 12 is kept low at the initial time of the regenerative power generation, it is preferable to generate electric power as much as possible up to an electric current that can be accepted by the battery 12 or up to the maximum generation current of the electric power generator 10. However, when on a long descending slope or the like, the estimated charging rate of the battery 12 becomes a predetermined charging rate and hence the electric power generator 10 stops electric-power generation, the power generation torque steeply decreases; thus, a shock may occur or a change (decrease) in the feeling of deceleration may deteriorate the drivability.

In this regard, in electric-power generation by the normal power generation control means, because kinetic energy is supplied by the internal combustion engine 1, an effect (the drivability), on the vehicle, that is provided by electric-power generation can be suppressed by changing the output of the internal combustion engine 1 in accordance with the torque required for electric-power generation; however, in regenerative power generation, because the kinetic energy is supplied only through the reduction of the vehicle speed, a change in the power generation torque directly provides an effect on the behavior of the vehicle.

Accordingly, it is preferable to restrict the power-generation amount at the time of regeneration in such a way that it tends to decrease, in order to make the difference between the power generation torque required when the electric power generator 10 charges the battery 12 and the power generation torque at a time when charging the battery 12 is stopped to be within such a predetermined torque difference as does not affect the drivability. In this case, the amount of energy to be recovered is slightly reduced; however, the drivability can be secured. Furthermore, the power-generation amount may gradually be reduced as the estimated charging rate of the battery 12 approaches a predetermined charging rate; the shock at a time when electric-power generation is stopped can further be reduced.

At a time point D, the driver releases the brake pedal and depresses the accelerator pedal; thus, the fuel supply to the internal combustion engine 1 is resumed and the regenerative power generation control means stops its control operation. Due to the regenerative power generation during the time between the time points C and D, the estimated charging rate of the battery 12 slightly rises; however, due to the decrease in the vehicle speed to a more extent, the regenerative predicted charging amount decreases and the target charging rate increases; therefore, at the time point D, the estimated charging rate of the battery 12 is slightly lower than the target charging rate. In this case, under the normal circumstances, electric-power generation by the normal power generation control means is implemented because the regenerative power generation by the regenerative power generation control means has been completed; however, because in the case where the regenerative power generation is ended by an acceleration request (depressing the accelerator pedal) to the vehicle, it can be predicted that the vehicle speed again rises, it is preferable to stop the electric-power generation by the normal power generation control means for a predetermined time. This is because when the vehicle speed rises and target charging rate decreases again, it is not required to implement the electric-power generation by the normal power generation control means.

The predetermined time may be a length in which the driver's intention is reflected in the vehicle speed; for example, it may be several tens of seconds. In addition, the electric-power generation by the normal power generation control means may be kept sopped until it is determined that the change in the vehicle speed becomes the same as or smaller than a predetermined value and has reached the vehicle speed requested by the driver.

As a result, the electric-power generation by the normal power generation control means is stopped for a predetermined period, and during that period, the target charging rate decreases as the vehicle speed rises; therefore, during the time between the time point D and a time point E, the electric-power generation by the normal power generation control means is not implemented, and there is demonstrated the same behavior as in the foregoing time between the time points B and C. After the battery 12 has discharged, the estimated charging rate and the target charging rate coincide with each other at the time point E; after that, the normal power generation control means performs power-generation control in such a way that the estimated charging rate maintains the target charging rate. In this case, there may be generated electric power corresponding to the electric power utilized by the vehicle so that neither the battery 12 is charged nor the battery 12 discharges.

At a time point F, the driver makes the accelerator operating amount to be "0" so as to reduce the vehicle speed; thus, fuel supply to the internal combustion engine 1 is stopped and hence the vehicle speed decreases. However, because the brake pedal is not depressed, regenerative power generation is implemented while the power generation torque is more restricted than when the brake pedal is depressed.

Because in the case where the brake pedal is not depressed, there exists no driver's operation, a change in the vehicle behavior due to a change in the power generation torque is more easily perceived than when the brake pedal is depressed. The driver just makes the accelerator operating amount to be "0" and does not desire to actively reduce the speed; however, when under this circumstances, torque is exerted due to excessive regenerative power generation and hence there is caused the feeling of deceleration that is more than requested, the driver depresses the accelerator pedal again. As a result, the drivability is deteriorated and the gasoline mileage is rather deteriorated.

After that, at a time point G, the power generation torque at a time when regenerative power generation is implemented increases due to the depression of the brake pedal; then, at a time point H, a decrease in the rotation speed of the internal combustion engine 1 removes the fuel stop condition and hence fuel supply is resumed; therefore, the regenerative power generation is completed.

At a time point H, the estimated charging rate of the battery 12 is lower than the target charging rate, and the regenerative power generation by the regenerative power generation control means has been completed in a mode other than acceleration request; thus, electric-power generation by the normal power generation control means is implemented so that the estimated charging rate coincides with the target charging rate. When the estimated charging rate and the target charging rate coincide with each other, power-generation control is implemented, as is the case with the time between the time points E and F, so that the estimated charging rate maintains the target charging rate.

It is preferable to generate electric power as much as possible up to an electric current that can be accepted by the battery 12 or up to the maximum generation current of the electric power generator 10 until the estimated charging rate coincides with the target charging rate. In electric-power generation by the normal power generation control means, because energy is supplied from the internal combustion engine 1, the power generation torque hardly provides an effect on the behavior of the vehicle. In the case where immediately after the vehicle stops, the driver stops the internal combustion engine 1, the charging rate of the battery 12 is left to be low, and hence the lifetime of the battery 12 may be shortened or the electric power may be insufficient when the vehicle is started next time; therefore, it is required to implement electric-power generation in such a way that the estimated charging rate immediately coincides with the target charging rate.

Next, there will be explained the operation of the vehicle power-generation control apparatus according to Embodiment 1 of the present invention. FIG. 3 is a flowchart representing processing performed in a constant cycle in the vehicle power-generation control apparatus according to Embodiment 1 of the present invention. The processing through the flowchart represented in FIG. 3 is performed in a constant cycle of 0.01 seconds.

Figure 3:
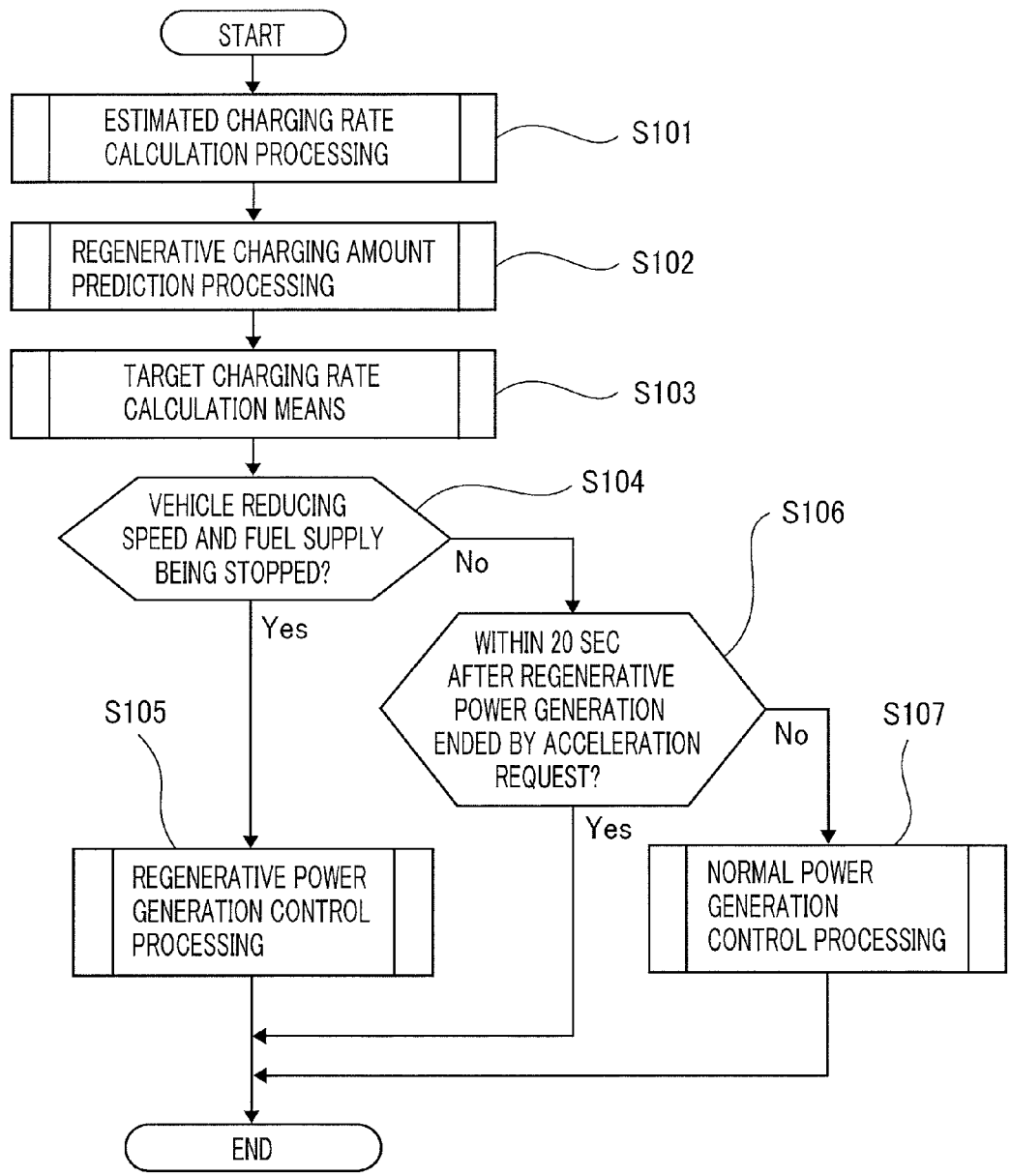
FIG. 3 is a flowchart representing processing performed in a constant cycle in a vehicle power-generation control apparatus according to Embodiment 1 of the present invention.

In FIG. 3, at first, estimated charging rate calculation processing is implemented in the step S101 in order to estimate the charging rate of the battery 12. As the estimation method, there may be utilized a method in which as described above, the voltage and the current detected by the battery sensor 18 are compared with the standard characteristics, of the battery 12, stored in the control unit 13.

Next, regenerative charging amount prediction processing is implemented in the step S102 in order to estimate the charging rate of the battery 12 at a time when regeneration is performed. As the prediction method, there may be utilized a method in which based on the maximum regenerative power generation amount acquired from the kinetic energy that is obtained, when the speed is reduced, in accordance with the current that can be accepted by the battery 12, the maximum generation current of the electric power generator 10, and the vehicle speed, the power-generation amount is obtained when the regenerative power generation torque is limited in such a way that as described above, the difference between the power generation torque at a time when regenerative power generation is implemented and the power generation torque at a time when regenerative power generation is not implemented falls within such a predetermined torque difference as does not provide any effect on the drivability. As the predetermined torque difference, there is utilized a torque difference obtained in regenerative power generation control processing, described later.

In the step S103, based on the regenerative predicted charging amount calculated in the step S102, the target charging rate of the battery 12 is calculated. The target charging rate may be calculated by obtaining the charging ratio of the battery 12 corresponding to the regenerative predicted charging amount; as the regenerative predicted charging amount increases, the target charging rate decreases.

In the step S104, it is determined whether or not the vehicle is reducing its speed and fuel supply is kept stopped. In the case where it is determined that the vehicle is reducing its speed and fuel supply is kept stopped (Yes), the step S104 is followed by the step S105, where regenerative power generation control processing (FIG. 4), described later, is implemented; then, the processing represented in FIG. 3 is ended.

In contrast, in the case where it is not determined that the vehicle is reducing its speed and fuel supply is kept stopped (No), the regenerative power generation control processing has not been implemented; thus, it is determined in the step S106 whether or not the present timing point is within 20 seconds after the regenerative power generation has been ended by an acceleration request.

In the case where it is determined in the step S106 that the present timing point is within 20 seconds after the regenerative power generation has been ended by an acceleration request (Yes), it is predicted, as described above, that the vehicle speed rises again and hence the electric-power generation by the normal power generation control processing is stopped for a predetermined time (20 seconds); therefore, the processing represented in FIG. 3 is ended.

In contrast, in the case where it is determined that the present timing point is not within 20 seconds after the regenerative power generation has been ended by an acceleration request (No), a normal power generation control processing (FIG. 5), described later, is implemented in the step S107; then, the processing represented in FIG. 3 is ended.

Figure 4:
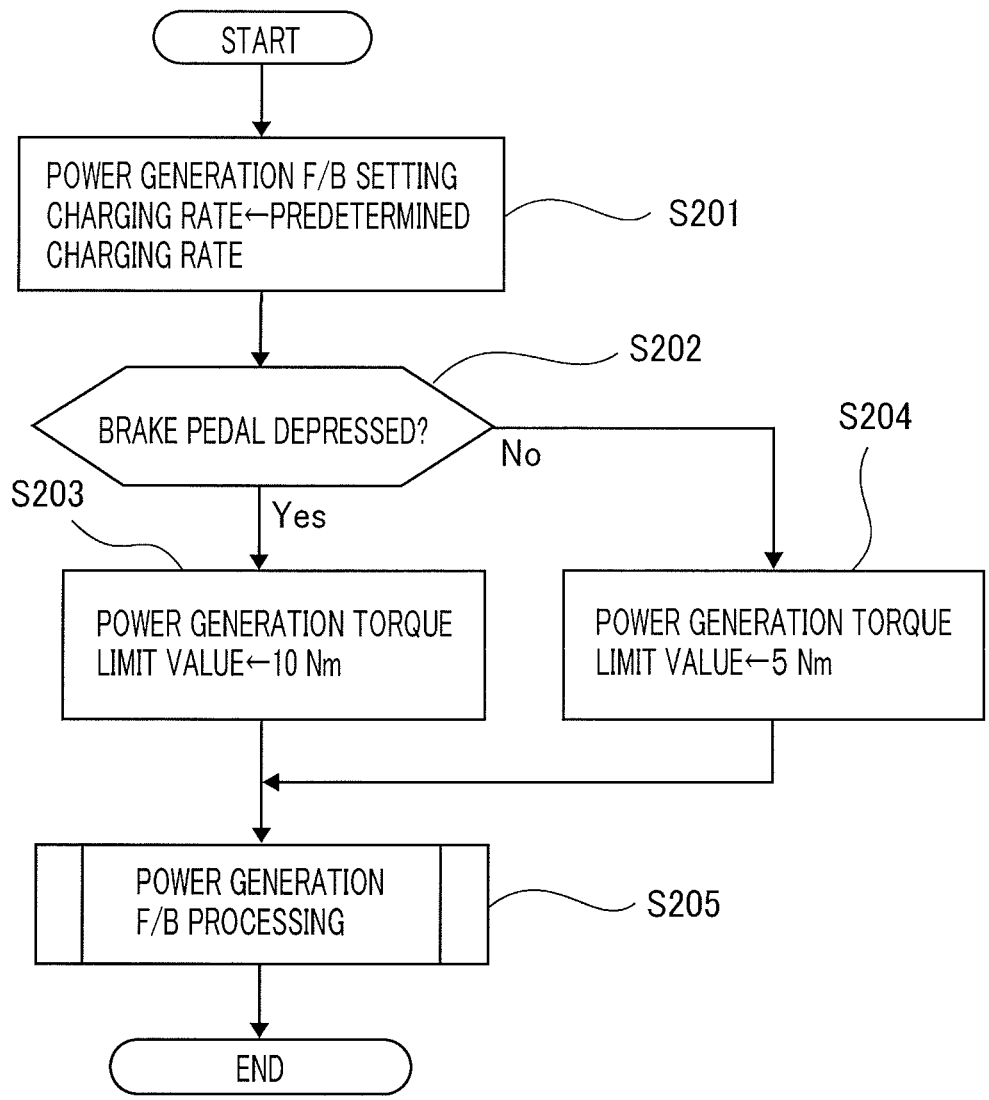
FIG. 4 is a flowchart representing regenerative power generation control processing in a vehicle power-generation control apparatus according to Embodiment 1 of the present invention.

Next, there will be explained the regenerative power generation control processing implemented in the step S105, described above. FIG. 4 is a flowchart representing the regenerative power generation control processing in the vehicle power-generation control apparatus according to Embodiment 1 of the present invention.

In FIG. 4, a power generation F/B setting charging rate is set to a predetermined charging rate in the step S201. The power generation F/B setting charging rate serves as a target value when the estimated charging rate of the battery 12 is F/B-controlled in power generation F/B processing, described later.

Next, in the step S202, it is determined whether or not the brake pedal has been depressed. In the case where it is determined that the brake pedal has been depressed (Yes), a power generation torque limit value is set to 10 Nm in the step S203; in the case where it is determined that the brake pedal has not been depressed (No), the power generation torque limit value is set to 5 Nm in the step S204. In addition, in Embodiment 1, a constant value is utilized as the power generation torque limit value; however, because regenerative power generation torque is supplied from the kinetic energy of the vehicle, the power generation torque limit value may be changed in accordance with the vehicle speed or the transmission ratio. By appropriately setting the power generation torque limit value, it is made possible to recover more regenerative energy while securing the drivability.

At last, the power generation F/B processing is implemented in the step S205; then, the processing in FIG. 4 is ended. The power generation F/B processing is to F/B-control the power-generation current of the electric power generator 10 within a range based on the power generation torque limit value set in the step S203 or S204 so that the estimated charging rate of the battery 12 coincides with power generation F/B setting charging rate. It goes without saying that the power-generation control is implemented over a range restricted by the current and the voltage that can be accepted by the battery 12 and the maximum generation current of the electric power generator 10.

The power generation torque limit value is the difference between the power generation torque at a time when regenerative power generation is implemented and the power generation torque at a time when regenerative power generation is not implemented; thus, for example, in the case where the power generation torque corresponding to the electric power supplied to the vehicle is 2 Nm, the electric power generator 10 may perform power generation in such a way that the power generation torque becomes 12 Nm when the brake pedal is depressed or 7 Nm when the brake pedal is not depressed. The electric power supplied to the vehicle is obtained from the difference between the generated electric power of the electric power generator 10 and the electric power utilized to charge the battery 12; by comparing the obtained electric power with the characteristics, preliminarily stored in the control unit 13, of the generated electric power and the power generation torque of the electric power generator 10, there is obtained the power generation torque that corresponds to the electric power supplied to the vehicle.

Next, there will be explained the normal power generation control processing implemented in the step S107, described above, in FIG. 3. FIG. 5 is a flowchart representing the normal power generation control processing in the vehicle power-generation control apparatus according to Embodiment 1 of the present invention.

In FIG. 5, the power generation F/B setting charging rate is set to the target charging rate in the step S301, and in the step S302, the power generation torque limit value is set to 100 Nm. The reason why the power generation torque limit value is set to 100 Nm is that the power generation torque limit value is nullified because the power generation F/B processing also plays the role of the regenerative power generation control processing.

At last, as is the case with the regenerative power generation control processing, the power generation F/B processing is implemented in the step S303; then, the processing in FIG. 5 is ended.

In addition, in Embodiment 1, the electric power generator 10 and the battery 12 are directly connected with each other; however, an apparatus such as a DC-to-DC converter may be disposed between the electric power generator 10 and the battery 12. Additionally, instead of the battery, an electric double layer capacitor may be utilized. These methods enable the efficiency and the power generation capacity of the electric power generator to be raised.

Moreover, there has been described that the electric power generator 10 is connected with the internal combustion engine 1 by means of a belt; however, there may utilized a configuration in which an electric power generator is provided between the internal combustion engine 1 and the transmission 14 or in which the electric power generator is the one (an power-generation motor) that can also play the role of an electric motor.

As described above, in the vehicle power-generation control apparatus according to Embodiment 1 of the present invention, by predicting, in accordance with the vehicle speed, the charging amount in regenerative power generation at a time when the vehicle speed is reduced, the target charging rate of an electric storage device is decreased as the regenerative predicted charging amount increases, and the regenerative power generation amount is limited toward reduction in such a way that the difference between torque required for power generation at a time when the electric storage device is charged and torque required for power generation at a time when the electric storage device is not charged falls within a predetermined torque difference; therefore, the electric storage device can be efficiently charged when regenerative power generation is implemented and the drivability can be prevented from deteriorating due to a change in the power generation torque when the regenerative power generation is implemented.

Moreover, the predetermined torque difference in the regenerative power generation control means is made to be a smaller value when there exists no braking operation than when there exists braking operation and the brake pedal is depressed; therefore, when there exists no braking operation, the regenerative power generation does not become excessive, whereby the drivability can be prevented from deteriorating.

Still moreover, in the case where the regenerative power generation is ended by an acceleration request to the vehicle, the operation of the normal power generation control is stopped for a predetermined time; therefore, by waiting for the target charging rate to decrease due to acceleration, the opportunities of implementing the normal power generation can be reduced and hence the gasoline mileage can be raised.

Various modifications and alterations of this invention will be apparent to those skilled in the art without departing from the scope and spirit of this invention, and it should be understood that this is not limited to the illustrative embodiments set forth herein.

What is claimed is:

1. A vehicle power-generation control apparatus comprising:
    an internal combustion engine that generates driving force for a vehicle;
    an electric power generator that converts kinetic energy supplied from the vehicle or the internal combustion engine into electric energy;
    an electric storage device that stores electric energy generated by the electric power generator and supplies electric power required by the vehicle;
    a voltage-current detection means that detects the voltage and the current of the electric storage device;
    an estimated charging rate calculation means that estimates a charging rate of the electric storage device based on the voltage and the current detected by the voltage-current detection means;
    a target charging rate calculation means that calculates a target charging rate of the electric storage device;
    a normal power generation control means that performs power-generation control of the electric power generator in such a way that an estimated charging rate of the electric storage device coincides with a target charging rate calculated by the target charging rate calculation means, in the case where the estimated charging rate of the electric storage device is lower than the target charging rate;
    a regenerative power generation control means that performs power-generation control of the electric power generator at a charging rate, of the electric storage device, that is the same as or lower than a predetermined charging rate at which overcharging is not caused, during a period in which the speed of the vehicle is being reduced and fuel supply to the internal combustion engine is stopped;
    a vehicle-speed detection means that detects a traveling speed of the vehicle; and
    a regenerative charging amount prediction means that predicts a regenerative charging rate in accordance with a vehicle speed detected by the vehicle-speed detection means, when the vehicle speed is being reduced,
    wherein the target charging rate calculation means decreases the target charging rate of the electric storage device as a regenerative predicted charging amount obtained by the regenerative charging amount prediction means increases;
    wherein the regenerative power generation control means limits a power-generation amount toward reduction in such a way that in the electric power generator, a difference between torque required for power generation at a time when the electric storage device is charged and torque required for power generation at a time when the electric storage device is not charged falls within a predetermined torque difference; and
    wherein the normal power generation control means stops its operation when the regenerative power generation control means is being implemented.

2. The vehicle power-generation control apparatus according to claim 1, wherein the predetermined torque difference in the regenerative power generation control means is made to be a smaller value when there exists no braking operation than when there exists braking operation and a brake pedal is depressed.

3. The vehicle power-generation control apparatus according to claim 1, wherein in the case where regenerative power generation is ended by an acceleration request to the vehicle, the operation of the normal power generation control means is stopped for a predetermined time.

* * * * *